July 20, 1948. E. A. FUGLIE 2,445,667
ELECTRICAL CIRCUIT TESTER
Filed Oct. 22, 1943 2 Sheets-Sheet 1
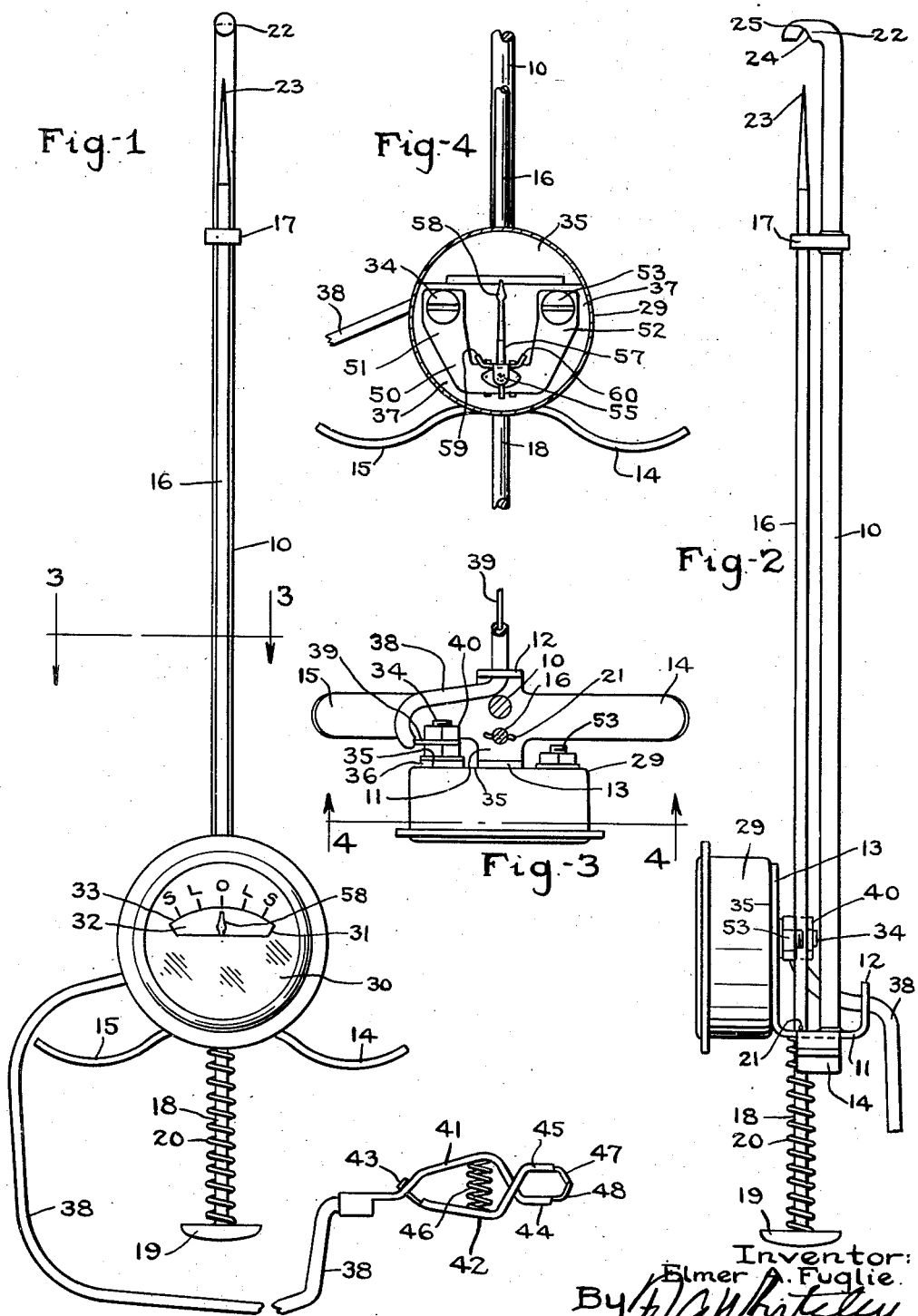

July 20, 1948.  E. A. FUGLIE  2,445,667
ELECTRICAL CIRCUIT TESTER
Filed Oct. 22, 1943  2 Sheets-Sheet 2
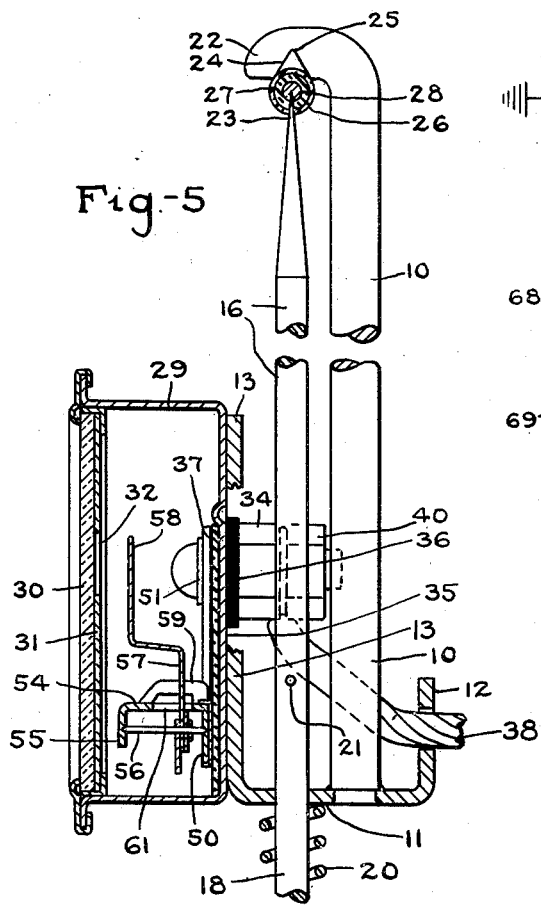
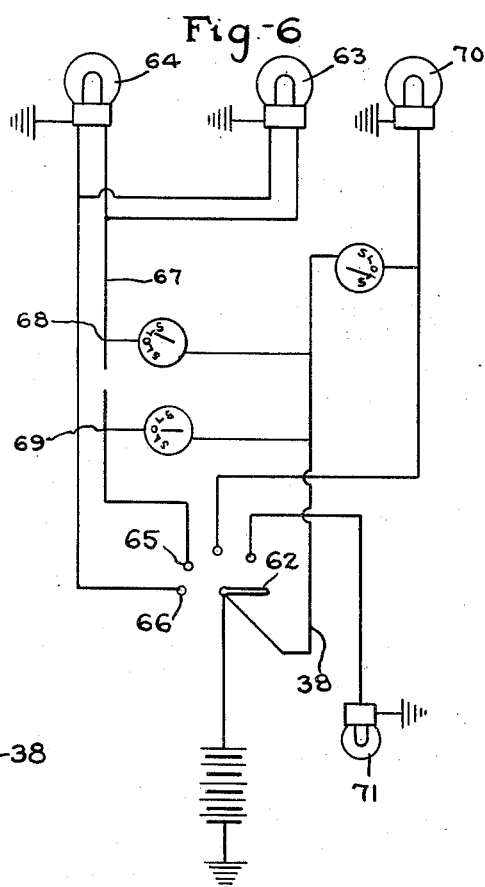
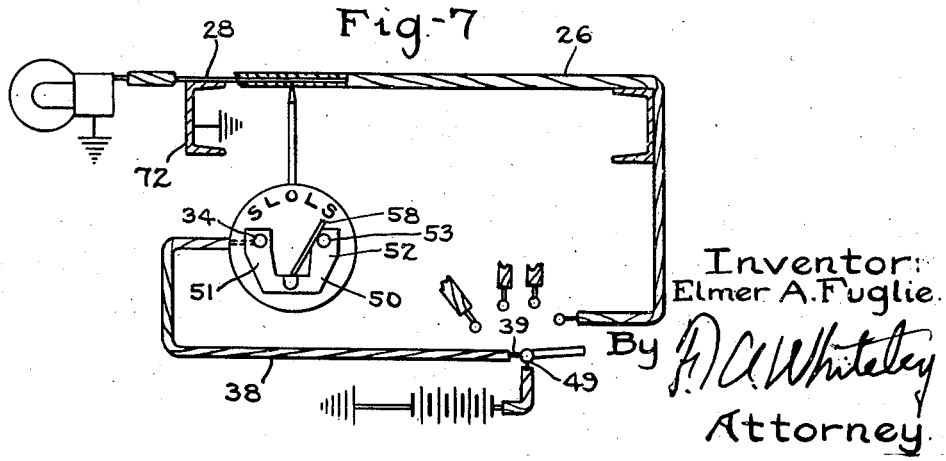
Inventor:
Elmer A. Fuglie.
By ⟨signature⟩
Attorney Patented July 20, 1948

2,445,667

UNITED STATES PATENT OFFICE 2,445,667

ELECTRICAL CIRCUIT TESTER

Elmer A. Fuglie, Winona, Minn., assignor to Winona Tool Manufacturing Company, Winona, Minn., a corporation of Minnesota Application October 22, 1943, Serial No. 507,346

1 Claim. (Cl. 175—183)

My invention relates to a short-and-break locator for electric wires and has for its object to locate in a wiring system, specifically a wiring system for automobiles, the point or points where a short exists or where the wire within its insulation has broken.

As is well known, breaks and shorts may occur in any wiring system. Such breaks and shorts are particularly liable to take place in the wiring system of an automobile, wherein the system itself is now extensive and complicated and the wires are subjected to heavy vibration and strain. When a short occurs, where the current is supplied from a battery, as in an automobile wiring system, the battery is drained of its electric potential, which is usually the first notification given of the existence of the short. Or, it may frequently happen that, without a short, the conductor wire may break inside of the insulation. This cuts off current to be supplied through that particular wire and is indicated in such a manner as a lamp or light failing to glow when switched on, even though testing shows the lamp to be in good lighting condition. In either of these contingencies it is necessary to locate the point in the wiring system where the short or the break occurs. This heretofore has proved a tedious and difficult operation, often consuming a large amount of time and resulting in serious expense.

I have discovered and invented an implement having means for piercing the insulation about the conductor so as to contact the conductor itself in combination with a protected ammeter structure, whereby when the insulation is pierced the existence or non-existence of current in the wire and of shorting or non-shorting current will be revealed and the point where such break or shorting exists will be located.

It is a principal object of my invention, therefore, to provide an instrument having a sharp pointed plunger and means for receiving an insulated electric conductor so that the metal point of the plunger may be caused to pierce the insulation and contact the wire.

It is a further object of my invention to provide such a device with an ammeter and means for conducting current through the ammeter whereby when current is located in the conducting wire the ammeter needle will indicate the presence of said current.

It is a further object of my invention to provide said ammeter with a built-in resistance which will protect it and the wiring and the operator when the piercing point engages a shorted wire.

It is a further object of my invention, as above noted, to control the current passing therethrough so as to indicate the character of current, whether normal lighting current or shorted current.

It is a further object of my invention to mount the plunger upon a standard having a hook-like extension at an angle to the length of the standard at one end in the path of movement of the sharp end of the plunger so that a wire held on said extension will be in the path of movement of the plunger.

It is a further object of my invention to provide on the hook extension some means for receiving the insulating conductor to position it in the path of the pointed end of the plunger so that when the plunger is forced upon the wire it will pierce the insulation and the metal end thereof will contact the conductor wire within the insulation.

It is a further object of my invention to provide the standard for carrying the plunger with finger holds and the plunger with a head engageable with the inside of the hand and with a spring surrounding the plunger between a bracket on the standard and the head whereby the plunger can be forced forward to pierce the insulation to a wire conductor and will be restored to an operative position when pressure upon it is released.

It is a further object of my invention to provide a conductor cable wired to the resistance and the ammeter needle control, which is provided with a clip adapted to be secured upon any suitable part which may be a source of electrical current, such for example as the starter terminal.

The full objects and advantages of my invention will appear in the detailed description thereof given in the appended specification and the novel features by means of which these important objects and advantages are realized will be particularly pointed out in the claim.

In the drawings illustrated an application of my invention in one form:

Fig. 1 is a plan view of my instrument for locating shorts and breaks, viewed at the front of the ammeter.

Fig. 2 is a side elevation view of my instrument being an edge view of what is shown in Fig. 1.

Fig. 3 is a sectional view taken on line 3—3 of Fig. 1 and viewed in the direction of the arrows.

Fig. 4 is a sectional view taken on line 4—4 of

Fig. 3, and viewed in the direction of the arrows.

Fig. 5 is an enlarged sectional view taken through the ammeter case and along the longitudinal plane of the plunger and the standard.

Fig. 6 is a diagrammatic view of a wiring system of an automobile showing diagrammatically the use of my instrument in locating breaks within the insulation.

Fig. 7 is a diagrammatic view of part of the wiring system of an automobile showing the use of my instrument in locating a short.

Referring particularly to Figs. 1, 2, and 3, I provide a standard 10. Secured to the upper end of this standard is a transverse bracket 11 which is formed with a short ear 12 on one side of the standard and a long ear 13 on the other side of the standard. There is also formed upon or secured to the bracket 11 a pair of finger holds 14 and 15. These finger holds are curved, as clearly shown in Fig. 1, and are adapted to receive the first two fingers of the hand. Extending through the bracket 11 in the position indicated in Fig. 3 is a plunger rod 16 which is substantially inside the plane of the inner edges of the finger holds 14 and 15. This plunger also extends through and is guided by a bracket 17 on the standard 10 near the outer end thereof, being held in parallel relation thereto, as clearly shown in Fig. 2. The plunger is adapted to extend a considerable distance above the outer face of bracket 11 as indicated at 18. The plunger has on its outer end a head 19 adapted to be positioned in the palm of the hand when the finger holds 14 and 15, and the plunger is surrounded by a compression spring 20 which is positioned between the head 19 and the outer face of the bracket 11 and tends to push the plunger outwardly. A stop pin 21 extending through the plunger 16, Figs. 2 and 3, is thus brought into engagement with the under side of the bracket 11, holding the plunger in normal retracted position.

The free end of standard 10 is turned inwardly in a projection 22 extending substantially at right angles to the standard 10 and being in the plane of the axial centers of standard 10 and plunger 16. The plunger 16 is formed with a needle-like point 23, Figs. 1 and 2, which is directed toward the extension 22 so that when the plunger is projected by operation of the hand upon the finger holds 14 and 15 and the head 19, the point 23 will be moved directly toward the axial center of the projection 22.

A wire holding guide 24 is formed in the body of the projection 22 facing the point 23 of the plunger 16. This holding guide may be of different forms, but I have found a V-shaped cut across at right angles to the extension 22 to be very satisfactory, with the point of the V at 25 directly in the line of travel of the point 23 of the plunger 16, as clearly shown in Fig. 2. In this manner an insulated wire, such as indicated at 26, Fig. 5, when laid upon the V 24 will be centered with respect to the point 23 so that it may readily be forced through the insulating covering 27 to the conducting wire 28, all as shown in Fig. 5.

As best shown in Figs. 4 and 5, there is secured to the long ear 13 of bracket member 11 an ammeter comprising a casing 29, a glass face 30, and a dial 31, Fig. 5, having thereon an opening 32. The curved edge 33 is provided with a scale showing a center figure O indicating no current, two intermediate positions at the sides thereof designated as L, meaning normal lamp current, and two calibrations still further removed designated as S, indicating short current.

A post 34 is secured to the bottom 35 of the casing 29 and is insulated therefrom by strips of Bakelite or other insulating material 36 and 37. An insulated wire 38 has its conducting wire 39 secured to the post 34 by means of a nut 40, Figs. 2 and 3. The conducting wire 39 is connected to and in circuit at the free end of cable or insulated wire 38 with a clip piece 41. A second clip piece 42, Fig. 1, is pivoted to the clip piece 41 at 43. These pieces 41 and 42 have reversely turned finger pieces 44 and 45 which are normally held in contact by a compression spring 46 located between the clip pieces 41 and 42. By squeezing on these pieces the spring may be compressed and the jaws 47 and 48 of the clip thus be opened to be placed upon and in conducting relation to any connection with the source of current, as a battery. In practice this connection may conveniently be made with the starter terminal, indicated at 49 in Fig. 7.

Within the ammeter casing 29 and secured to the bottom 35 thereof is a resistance piece 50. This resistance piece has one arm 51 which receives the post 34 and is in circuit with the contact wire 39 in cable 38 leading to the contact clip and the source of electric current to which the clip is attached. The resistance 50 has a second arm 52 which is secured by screw post 53, Fig. 4, directly upon the back wall 35 of the ammeter case and thus is in circuit with the ear 13 and bracket 11 and through contacts of that bracket and of spring 20 with parts of the plunger 16 is also in circuit with the plunger and its piercing point.

The resistance piece 50 has secured thereto or formed as a part thereof an arm 54 extending normal to or at right angles to the resistance piece 50 and provided with a backward extension or lip 55, Fig. 5. Between the resistance piece 50 and the lip 55 is pivotally mounted a pintle 56 which has secured thereto the shank 57 of an indicator needle which has the needle portion 58 brought to the upper part of the ammeter chamber close to the dial 31 and so as to move along the opening 32 therein. The pintle 56 has a mounting which permits a movement of the needle 58 upon the pintle with negligible resistance. Wings 59 and 60 are formed as a part of the arm 54 and leave an opening 61 through which the needle shank 57 extends. The wings 59 and 60 operate as stops to limit the swinging movement of the needle shank 57 and its needle portion 58, as clearly appears in Figs. 4 and 5. This is a standard ammeter construction, which need not further or more in detail be described. It is sufficient to say here that the needle construction 57 and 58 is normally balanced in position so that if no current passes through the resistance 50 the needle end 58 will point to zero on the dial 31. If moderate current flows, as to a light, the deflection will be slight or to the point on the scale indicated as "L." But if strong current flows, as for a short, the deflection will be correspondingly greater to the point on the dial indicated as "S."

The operation of the construction is shown diagrammatically in Figs. 6 and 7. The operative switch 62 as the light switch is thrown into circuit making position. All other switches are turned off. If, for example, a condition arises in which the headlights do not operate when the switch 62 is closed for lighting, these headlights 63 and 64 either on the driving or highlight circuit 65 or the dimmer circuit 66, and one or the other of these lights, for example the driving lights, do not glow, even though testing shows that the lamps are perfectly operative, it will be evident that there is a break in the wire somewhere. To find the break the instrument is connected to the battery circuit, as to the starter terminal at 49, and the instrument is applied to the insulated highlight wire 67 at a point 68 and the needle point caused to pierce the insulation and so to contact the conductor wire. If ammeter needle is shifted to "L," meaning light, the operator is informed that the break is farther removed from the lamp.

The operator will continue to pierce the insulated circuit wire 67 at various points until finally he reaches a point indicated at 69 where the ammeter needle remains at zero. The operator then is informed that the break is between the point of earlier testing the wire as at 68 and the point of last testing the wire as at 69. The break is thus located and repair can be made. This, of course, can be carried out effectively for other circuits, as the dome light circuit 70 and the tail light circuit 71. In this manner the location of a break in the wire inside the insulation may be quickly discovered and the repair made with a minimum expenditure of time and expense.

If there is a short which has drained the battery, it almost always results from a place where the insulation of the circuit wire 26 has been worn away so that the conducting wire 39 is brought into contact with a frame member, as member indicated at 72 in Fig. 7. When such a short exists the frame piece must, of course, be between the source of electric current and the implement to be energized, as one of the lamps.

If the insulation is pierced and the conducting wire contacted between the short and the lamp or other implement to be energized, or at any other point on the wire between the switch terminal and the short, heavy current will go through resistance 50 with the result that the needle will shift to the position indicated by the letter "S" indicating that that wire is the one in which the short exists and following the wire through the short can then be located.

Where the short exists in a lighting circuit, the particular wire which is shorted usually can be found by merely touching with the point end of the tester the connecting terminal on the light switch. As illustrated, the wire 38 is connected with the battery and successively touching the terminals at the light switch will cause the lamps to glow if no short is present and will indicate at "L" on the dial, but when a short is present in the tested lighting wire the light will not glow and the needle will swing to the point designated as "S" indicating a short in that wire. Otherwise, the operator will work under the hood, preferably from the steering wheel side, where most trouble is to be found, and will successively pierce different wires until a short is indicated.

The advantages of my invention will sufficiently appear in the foregoing analysis and description given in the specification. It is a simple, inexpensive construction which can be put in the hands of garagemen and repairmen generally at a relatively low cost, and by the use of which in a simple series of successive testings the broken wire or short quickly can be located.

I claim:

A short-and-break locator for electric wiring in position such as the insulated conducting electric wiring of an automobile, comprising a support formed of an integral elongated bar, an integral portion offset at right angles from said bar provided with a notch to receive and position an insulated wire, a plunger rod mounted for endwise movement close to and parallel with the bar having a sharpened point in longitudinal alignment with the center of said notch, said plunger extending beyond the outer end of the support and having a palm-engaging knob on its outer end, a spring about said extended portion for forcing the plunger away from the notch, finger grips rigidly connected to the standard so the appliance can be held in one hand of an operator for forcing the point through the insulation to cause the point to contact the conducting wire within the insulation, an ammeter held by the standard close to the finger grips and plunger, and an elongated wire connected with one terminal of the ammeter having thereon a clip adapted to be put in electrical circuit connection with the source of electric current for the electric wiring the rod and the plunger point being in circuit connection with the other terminal of the ammeter.

ELMER A. FUGLIE.

REFERENCES CITED

The following references are of record in the file of this patent:

UNITED STATES PATENTS

| Number | Name | Date |
|---|---|---|
| 418,855 | Storey | Jan. 7, 1890 |
| 552,166 | Woodward | Dec. 31, 1895 |
| 953,678 | Luther et al. | Mar. 29, 1910 |
| 1,395,819 | Guy | Nov. 1, 1921 |
| 1,454,623 | Carter | May 8, 1923 |
| 1,684,798 | Iler | Sept. 18, 1928 |
| 1,707,051 | Colosoff | Mar. 26, 1929 |
| 1,771,219 | Hein | July 22, 1930 |
| 1,888,906 | Colosoff | Nov. 22, 1932 |
| 2,237,187 | Mantilla | Apr. 1, 1941 |